(12) United States Patent
Agawa et al.

(10) Patent No.: US 6,649,267 B2
(45) Date of Patent: Nov. 18, 2003

(54) THERMOSETTING POWDER COATING COMPOSITION, METHOD OF PREPARATION THEREOF AND COATED ARTICLE THEREWITH

(75) Inventors: Tetsuro Agawa, Osaka (JP); Katsuhiko Okada, Osaka (JP); Hiroo Tanaka, Osaka (JP); Masaya Hashimoto, Kitakatsuragi-gun (JP); Takaaki Asakura, Osaka (JP)

(73) Assignees: Dainippon Ink and Chemicals, Inc., Tokyo (JP); Liquid Gas Co., Ltd., Osaka (JP)

( * ) Notice: Subject to any disclaimer, the term of this patent is extended or adjusted under 35 U.S.C. 154(b) by 0 days.

(21) Appl. No.: 10/166,358

(22) Filed: Jun. 11, 2002

(65) Prior Publication Data

US 2003/0026993 A1 Feb. 6, 2003

(30) Foreign Application Priority Data

Jun. 15, 2001 (JP) ...................................... P2001-181533

(51) Int. Cl.$^7$ .......................... B32B 27/38; B32B 27/30; F26B 03/12; C08L 37/00
(52) U.S. Cl. ...................... 428/413; 428/332; 428/523; 34/372; 525/172; 525/176; 525/194; 525/197; 525/206; 525/208
(58) Field of Search ................................. 525/191, 192, 525/194, 197, 206, 208, 172, 176; 264/13; 428/332, 413, 523; 523/330, 340; 34/372

(56) References Cited

U.S. PATENT DOCUMENTS 5,207,954 A * 5/1993 Lewis et al. .................. 264/13
5,948,866 A   9/1999 Takeda et al.

* cited by examiner

Primary Examiner—Robert Dawson
Assistant Examiner—Michael J. Feely
(74) Attorney, Agent, or Firm—Armstrong, Westerman & Hattori, LLP (57) ABSTRACT

A thermosetting powder coating composition has an average particle diameter of entire particles is within a range from 5 to 50 $\mu$m, an average circularity of the particles is 0.90 or more, and a circularity of particles having a maximum number frequency in circularity distribution is within a range from 0.98 to 1.00, prepared by spray-drying an organic solvent solution containing, as a coating film forming component, an epoxy group-containing vinyl copolymer (A) having a glass transition temperature of 40° C. or higher, an epoxy group-containing vinyl copolymer (B) having a glass transition temperature of 0° C. or lower and a polycarboxylic acid (C) as an essential component.

4 Claims, 2 Drawing Sheets

THERMOSETTING POWDER COATING COMPOSITION, METHOD OF PREPARATION THEREOF AND COATED ARTICLE THEREWITH

BACKGROUND OF THE INVENTION

1. Field of the Invention

The present invention relates to a thermosetting powder coating composition, which is superior in fluidity and coating operability and can form a coating film having excellent smoothness, finishing appearance and scratch resistance, and a coated article obtained by using the same.

2. Description of Related Art

Powder coating compositions have widely been used as an environmentally friendly coating composition, which do not emit organic solvents into the air during coating, in the entire metallic coating field. Among these powder coating compositions, a thermosetting powder coating composition has been used for various purposes because of its excellent coating performances.

However, a conventional coating composition in the field of the coating compositions had problems in that a relatively large film thickness and a high curing temperature are required so as to obtain the same appearance as that in the case of using a solvent-based coating composition. In the field of industry that requires coatings, such as the automotive industry or can manufacturing industry, there has been a strong desire to develop a coating composition which forms a thin film having good surface appearance and maintains stable quality even when coating continuously, in view of cost reduction and weight reduction.

In the process for preparing a coating composition using a melt-kneading process, which is generally used as the process for preparing a conventional coating composition, each particle diameter of a coating composition is reduced to improve the smoothness of the thin film. However, since mechanical grinding process is used to reduce the particle diameter, the cost for preparation of the coating composition increases. There is also a problem in that it is very difficult to reconcile good coatability with good appearance of the coating film because the particle diameter and the particle configuration are not easily controlled.

To cope with this problem, a powder coating composition for imparting excellent finishing appearance and a coating process thereof are disclosed in U.S. Pat. No. 5,948,866. Since a coating film having excellent finishing appearance and scratch resistance can be obtained when using the powder coating composition, the publication discloses that it is enable to apply the powder coating composition for purposes such as automobile top clear coating, where the powder coating composition has hardly been used because the resulting thin film has poor finishing appearance, by making the best use of the feature.

Although the powder coating composition is certainly superior in the finishing appearance and scratch resistance as compared with a conventional powder coating composition, the powder coating composition is still inferior in fluidity, coating operability and storage stability because it was prepared by the melt-kneading process. There is further scope of improvement.

According to this melt-kneading process, for example, a powder coating composition is prepared by mixing raw materials such as resins, curing agents, plasticizers, stabilizers, fluidity modifiers, pigments and fillers using a high speed mixer such as a Henschel mixer, melt-kneading this mixture in a high shear mixer such as extruder, thereby completely dispersing the respective raw materials, cooling the melt-kneaded mixture, grinding it into powders, and classifying the powders.

Since the powder coating composition is prepared through these processes, the thermosetting resin and the respective components such as curing agent are not homogeneously mixed sufficiently. When small particles are formed, the particle size distribution of ground particles is likely to become broad, and the particles are of non-uniform shape. Therefore, the fluidity of the powder coating composition is lowered and an adverse influence is likely to be exerted on the coating operability and storage stability of the powder coating composition. In particular, the appearance of the coating film is likely to become poor in the formation of the thin film.

BRIEF SUMMARY OF THE INVENTION

An object to be achieved by the present invention is to provide a powder coating composition, which is superior in fluidity and coating operability and forms a coating film having excellent smoothness, finishing appearance and scratch resistance even when the resulting film has a small thickness such as 50 μm or less, and a coated article thereof.

The present inventors have intensively researched to achieve the object described above and have found that a coating film formed by using a thermosetting powder coating composition comprising, as a coating film forming component, particles containing specific components, wherein an average particle diameter of entire particles is within a range from 5 to 50 μm, an average circularity of the particles is 0.90 or more, and a circularity of particles having a maximum number frequency in circularity distribution is within a range from 0.98 to 1.00, is noticeably superior in smoothness when formed into a thin film, and is also superior in fluidity and electrostatic coatability. Thus, the present invention has been completed.

The present invention provides a thermosetting powder coating composition comprising, as a coating film forming component, particles containing an epoxy group-containing vinyl copolymer (A) having a glass transition temperature of 40° C. or higher, an epoxy group-containing vinyl copolymer (B) having a glass transition temperature of 0° C. or lower and a polycarboxylic acid (C) as an essential component, wherein an average particle diameter of entire particles is within a range from 5 to 50 μm, an average circularity of the particles is 0.90 or more, and a circularity of particles having a maximum number frequency in circularity distribution is within a range from 0.98 to 1.00, and a coated article comprising an article to be coated and a coating film formed on the article to be coated by thermosetting the powder coating composition.

The present invention also provides a process for preparing a thermosetting powder coating composition having the feature described above by spray-drying a raw powder coating composition solution comprising an epoxy group-containing vinyl copolymer (A) having a glass transition temperature of 40° C. or higher, an epoxy group-containing vinyl copolymer (B) having a glass transition temperature of 0° C. or lower and a polycarboxylic acid (C) as an essential component.

The coating composition and the coated article according to the constitution of the present invention are superior in smoothness and scratch resistance in the form of a coating film, and the coating composition is superior in fluidity and coating operability.

DETAILED DESCRIPTION OF THE INVENTION

The present invention will be described in detail below.

First, the particle configuration of the powder coating composition as one of the features of the powder coating composition of the present invention will be described below.

The powder coating composition of the present invention is characterized by an average particle diameter within a range from 5 to 50 μm. Furthermore, the average particle diameter is preferably within a range from 10 to 30 μm because the appearance of the thin film can be further improved. The average particle diameter means a volume-average median diameter and can be measured, for example, by a laser diffraction particle size analyzer (SALD-2000, manufactured by Shimadzu Corporation).

The powder coating composition of the present invention is substantially spherical and has an average circularity of 0.90 or more, and a circularity of particles having a maximum number frequency in circularity distribution is within a range from 0.98 to 1.00. Substantially completely spherical particle configuration makes it possible to exert effects such as excellent fluidity and coating operability of the present invention, as an object to be achieved by the present invention. From such a point of view, the number frequency of particles having a circularity of 0.90 or more is preferably 50% or more, and more preferably 70% or more.

As used herein, the term "circularity" or "average circularity" is one of the particle configuration indexes, which indicates the unevenness of the surface of particles, and is represented by the following equation:

Circularity=(perimeter of a circle having the same area as that of a projected area of particles)/(perimeter of a projected image of particles).

Therefore, the circularity is 1 when the projected image of particles has a complete circular configuration, while it becomes a smaller value when the projected image of particles is not round and has an elongated or irregular configuration. The average circularity is determined by dividing a value, which is obtained by summing up all circularities of the respective particles, by the total number of particles.

The configuration and the average circularity of the powder coating composition can be measured by a flow type particle image analyzer (FPIA-1000, manufactured by Toa Medical Electronics Co., Ltd.). The configuration of the powder coating composition can also be confirmed by a scanning electron microscope.

As used herein, the term "circularity of particles having a maximum number frequency in circularity distribution" refers to a circularity within a section where a number frequency of the respective sections (circularity: 0.01 in width) becomes maximum when the circularity of 0.40 to 1.00 of particles is divided into 61 sections in the circularity frequency distribution determined by the measurement described above.

Next, the respective raw materials used to prepare the powder coating composition of the present invention will be described.

As raw materials of the powder coating composition of the present invention, an epoxy group-containing vinyl copolymer (A) having a glass transition temperature of 40° C. or higher and an epoxy group-containing vinyl copolymer (B) having a glass transition temperature of 0° C. or lower are used as a thermosetting resin, namely, a base resin, and a polycarboxylic acid (C) is used as a curing agent thereof. By using the composition composed of them as a raw material, the resulting coating film is superior in finishing appearance and scratch resistance.

The epoxy group-containing vinyl copolymer (A) having a glass transition temperature of 40° C. or higher refers to a vinyl copolymer which has two epoxy groups on the average in a molecule and has a glass transition temperature of 40° C. or higher. The glass transition temperature can be measured by differential scanning calorimetry and is determined from a first inflection point at a heating rate of 10° C. per minute.

While publicly known and conventional methods can be applied to prepare the epoxy group-containing vinyl copolymer (A), a method of using an epoxy group-containing vinyl monomer and, if necessary, other copolymerizable vinyl monomers and polymerizing these monomers in an organic solvent is most simple and preferred. In that case, publicly known and conventional polymerization initiators and solvents can be used as they are.

Examples of the epoxy group-containing vinyl monomer used in the preparation of the epoxy group-containing vinyl copolymer (A) include various epoxy group-containing monomers such as glycidyl (meth)acrylate, β-methyl glycidyl (meth)acrylate, glycidyl vinyl ether, and allyl glycidyl ether; (2-oxo-1,3-oxorane) group-containing vinyl monomers such as (2-oxo-1,3-oxorane)methyl (meth)acrylate; and various alicyclic epoxy group-containing vinyl monomers such as 3,4-epoxycyclohexyl (meth)acrylate, 3,4-epoxycyclohexyl methyl (meth)acrylate, and 3,4-epoxycyclohexyl ethyl (meth)acrylate.

As the other vinyl monomer, which is copolymerizable with such an epoxy group-containing vinyl monomer, (meth)acrylic acid or crotonic acid or esters thereof and publicly known and conventional ethylenically unsaturated bond-containing monomers can be used. These monomers may be used alone, or two or more kinds of them may be used in combination.

Typical examples of the ester of the (meth)acrylic acid described above include alkyl (meth)acrylate ester, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isododecyl (meth)acrylate, lauryl (meth)acrylate, or stearyl (meth)acrylate; benzyl (meth)acrylate, phenyl (meth)acrylate, phenoxyethyl (meth)acrylate, or tetrahydrofurfuryl (meth)acrylate; various alkylcarbitol (meth)acrylates such as ethylcarbitol (meth)acrylate; isobornyl (meth)acrylate, dicyclopentanyl (meth)acrylate, dicyclopentenyl (meth)acrylate, or dicyclopentenyloxy ethyl (meth)acrylate; hydroxyl group-containing (meth)acrylate esters such as 2-hydroxyethyl (meth)acrylate, 2-hydroxypropyl (meth)acrylate, 3-hydroxypropyl (meth)acrylate, and 4-hydroxybutyl (meth)acrylate; and polyethylene glycol mono(meth)acrylate or polypropylene glycol mono(meth)acrylate; and so-called lactone-modified hydroxyl group-containing (meth)acrylates prepared by subjecting various hydroxyl group-containing (meth)acrylate esters to the ring-opening reaction of ε-caprolactone.

Typical examples of the other ethylenically unsaturated monomer include various hydrolyzable silyl group-containing monomers such as γ-(meth)acryloyloxypropyl trimethoxysilane, γ-(meth)acryloyloxypropyl triethoxysilane, and γ-(meth)acryloyloxypropyl methyldimethoxysilane; various fluorine-containing α-olefins such as vinyl fluoride, vinylidene fluoride, trifluoroethylene, tetrafluoroethylene, chlorotrifluoroethylene, bromotrifluoroethylene, pentafluoropropylene, and hexafluoropropylene; various fluorine-containing vinyl monomers, for example, perfluoroalkyl perfluorovinyl ether and (per)fluoroalkyl vinyl ether (provided that an alkyl group has 1 to 18 carbon atoms) such as trifluoromethyl trifluorovinyl ether, pentafluoroethyl trifluorovinyl ether, or heptafluoropropyl trifluorovinyl ether, and phosphate ester group-containing vinyl monomer such as mono[(meth) acryloyloxyethyl]phosphate, (meth)acrylate acidic phosphate, or phenyl (meth)acryloyloxyethyl phosphate; mono- and diesters of various polyhydric carboxyl group-containing monomers such a fumaric acid, maleic acid and itaconic acid and a monoalkyl alcohol having 1 to 18 carbon atoms; various aromatic vinyl compounds such as styrene, vinyl toluene, α-methylstyrene, and p-tert-butylstyrene; various amino group-containing amide-based vinyl monomers such as (meth)acrylamide, N-methyl (meth) acrylamide, N-ethyl (meth)acrylamide, N-n-propyl (meth) acrylamide, N-iso-propyl (meth)acrylamide, N-n-butyl (meth)acrylamide, N-iso-butyl (meth)acrylamide, N-tert-butyl (meth)acrylamide, N-amyl (meth)acrylamide, N-(meth)acrylamide, N-hexyl (meth)acrylamide, N-heptyl (meth)acrylamide, N-2-ethylhexyl (meth)acrylamide, N,N-dimethyl (meth)acrylamide, N,N-diethyl (meth)acrylamide, N-methylol (meth)acrylamide, N-methoxymethyl (meth) acrylamide, N-ethoxymethyl (meth)acrylamide, N-n-propoxymethyl (meth)acrylamide, N-iso-propoxymethyl (meth)acrylamide, N-n-butoxymethyl (meth)acrylamide, N-iso-butoxymethyl (meth)acrylamide, N-tert-butoxymethyl (meth)acrylamide, N-amyloxymethyl (meth) acrylamide, N-hexyloxy (meth) acrylamide, N-hepthyloxymethyl (meth) acrylamide, N-octyloxymethyl (meth)acrylamide, N-2-ethyl-hexyloxymethyl (meth) acrylamide, and diacetone (meth)acrylamide; various dialkylaminoalkyl (meth)acrylates such as dimethylaminoethyl (meth)acrylate and diethylaminoethyl (meth)acrylate; various nitrogen-containing vinyl monomers such as tert-butylaminoethyl (meth)acrylate, tert-butylaminopropyl (meth)acrylate, aziridinyl ethyl (meth)acrylate, pyrrolidinyl ethyl (meth)acrylate, piperidinyl ethyl (meth)acrylate, (meth)acryloyl morpholine, N-vinyl-2-pyrrolidone, N-vinyl caprolactam, N-vinyl oxazoline, and (meth)acrylonitrile; various aliphatic vinyl carboxylates such as vinyl acetate, vinyl propionate, vinyl butyrate, vinyl isobutyrate, vinyl caproate, vinyl caprate, vinyl caprinate, vinyl laurate, $C_9$ branched aliphatic vinyl carboxylate, $C_{10}$ branched aliphatic vinyl carboxylate, $C_{11}$ branched aliphatic vinyl carboxylate, and vinyl stearate; various vinyl esters of carboxylic acid, which have a cyclic structure, such as vinyl cyclohexanecarboxylate, vinyl methylcyclohexanecarboxylate, vinyl benzoate, and vinyl p-tert-butyl benzoate; various alkyl vinyl ethers such as ethyl vinyl ether, hydroxyethyl vinyl ether, hydroxy-n-vinyl ether, hydroxyisobutyl vinyl ether, cyclohexyl vinyl ether, and lauryl vinyl ether; various halogenated olefins other than fluorine-containing α-olefins described above, such as vinyl chloride and vinylidene chloride; and various α-olefins such as ethylene, propylene, and butene-1.

In the preparation of the epoxy group-containing vinyl copolymer (A), various publicly known compounds can be used as the radical polymerization initiator.

Typical examples thereof include various azo compounds such as 2,2'-azobis-isobutylonitrile, 2,2'-azobis-methylbutylonitrile, 2,2'-azobis-2,4-dimethylvaleronitrile, 1,1'-azobis-cyclohexanecarbonitrile, dimethyl-2,2'-azobisisobutyrate, 4,4'-azobis-4-cyanovaleric acid, 2,2'-azobis-(2-amidinopropene) dihydrochloride, 2-tert-butylazo-2-cyanopropane, 2,2'-azobis-(2-methylpropionamide) dihydrate, 2,2'-azobis-[2-(2-imidazolin-2-yl)propene], and 2,2'-azobis-(2,2,4-trimethylpentane); and various ketone peroxides; peroxyketals, hydroperoxides; dialkyl peroxides, diacyl peroxides, peroxyesters; peroxydicarbonates and hydrogen peroxide; such as benzoyl peroxide, methyl ethyl ketone peroxide, cumenhydro peroxide, potassium persulfate, tert-butylperoxy neodecanoate, tert-butylperoxy pivalate, tert-butylperoxy-2-ethyl hexanoate, tert-butylperoxy isobutyrate, 1,1-bis-tert-butylperoxy-3,3,5-trimethylcyclohexane, tert-butylperoxy laurate, tert-butylperoxy isophthalate, tert-butylperoxy acetate, tert-butylperoxy benzoate, dicumyl peroxide, and di-tert-butyl peroxide.

In the preparation of the epoxy group-containing vinyl copolymer (A), publicly known and conventional organic solvents can be used as the organic solvent.

Examples of the organic solvent include alkyl alcohols such as methanol, ethanol, n-propanol, isopropanol, n-butanol, isobutanol, sec-butanol, tert-butanol, n-pentanol, and isopentanol;

glycol ethers such as methylcellosolve, ethylcellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, and propylene glycol diethyl ether;

aromatic hydrocarbons such as benzene, toluene, xylene, and ethylbenzene;

mixed hydrocarbons containing an aromatic hydrocarbon such as "Exxon Aromatic Naphtha No. 2" (manufactured by Exxon Corp., USA); aliphatic hydrocarbons such as n-pentane, n-hexane, and n-octane; mixed hydrocarbons containing an aliphatic hydrocarbon, such as "ISOPAR C", "ISOPAR E", "EXXSOL DSP100/140", "EXXSOL D30" (manufactured by Exxon Corp.), "IP Solvent 1016" (manufactured by Idemitsu Petrochemical Co., Ltd.);

alicyclic hydrocarbons such as cyclopentane, cyclohexane, methylcyclohexane, and ethylcyclohexane;

ethers such as tetrahydrofuran, dioxane, diisopropyl ether, and di-n-butyl ether; ketones such as acetone, methyl ethyl ketone, and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate, and butyl propionate. A small amount of water can be used in combination with the organic solvents described above.

If necessary, chain transfer agent can be used. Typical examples thereof include dodecylmercaptan, laurylmercaptan, thioglycolate ester, mercapto ethanol, and α-methylstyrene dimer.

The epoxy group-containing vinyl copolymer (A) used in the present invention has a glass transition temperature of 40° C. or higher, but this glass transition temperature is preferably within a range from 50 to 90° C., and more preferably from 60 to 80° C., so as to ensure excellent storage stability of the powder coating composition and excellent smoothness of the coating film. When the glass transition temperature is lower than 40° C., the storage stability of the resulting powder coating composition is likely to become poor and, therefore, it is not preferred.

The number-average molecular weight of the epoxy group-containing vinyl copolymer (A) having a glass transition temperature of 40° C. or higher is preferably within a range from about 1,000 to 10,000, and more preferably from 1,500 to 6,000.

The epoxy equivalent in the epoxy group-containing vinyl copolymer (A) is preferably within a range from about 250 to 1000, and more preferably from 300 to 600.

Next, the epoxy group-containing vinyl copolymer (B) having a glass transition temperature of 0° C. or lower used in the present invention will be described.

To prepare the epoxy group-containing vinyl copolymer (B), publicly known and conventional methods can be applied similar to the case of the epoxy group-containing vinyl copolymer (A). The method using an epoxy group-containing vinyl monomer, which can be used for the epoxy group-containing vinyl copolymer (A), and, if necessary, other copolymerizable vinyl monomers, and polymerizing these monomers in an organic solvent is recommended because this method is most simple. Publicly known and conventional polymerization initiators and solvents can be used as they are.

In the preparation of the epoxy group-containing vinyl copolymer (B), the epoxy group-containing vinyl monomers, other copolymerizable vinyl monomers, radical polymerization initiators, and chain transfer agents, which were described as those used in the preparation of the epoxy group-containing vinyl copolymer (A), can be used, respectively.

The epoxy group-containing vinyl copolymer (B) used in the present invention has a glass transition temperature of 0° C. or lower, but this glass transition temperature is preferably within a range from −5 to −80° C., and more preferably from −10 to −50° C., so as to ensure excellent scratch resistance and smoothness of the coating film. When the glass transition temperature is higher than 0° C., the storage stability of the resulting powder coating composition is likely to become poor and, therefore, it is not preferred.

The epoxy equivalent of the epoxy group-containing vinyl copolymer (B) is preferably 1,500 or less, and more preferably 800 or less, so as to ensure stability, as time elapses, in excellent properties of the coating film obtained by using the powder coating composition of the present invention, for example, scratch resistance.

The number-average molecular weight of the epoxy group-containing vinyl copolymer (B) is preferably within a range from about 2,000 to 20,000, and more preferably from 4,000 to 15,000.

The amount of the epoxy group-containing vinyl copolymer (B) to be added is preferably within a range from about 0.1 to 10% by weight, and more preferably from 0.5 to 5% by weight, based on the component (A). It is preferred that the epoxy group-containing vinyl copolymer (A) be not substantially compatible with the epoxy group-containing vinyl copolymer (B) in the amount of the epoxy group-containing vinyl copolymer (B) to be added so as to ensure excellent smoothness and scratch resistance of the resulting coating film. As used herein, the expression "not substantially compatible with" refers to the case where, when the coating film is formed by mixing the epoxy group-containing vinyl copolymer (A) with the epoxy group-containing vinyl copolymer (B) in the amount described above, melting the both with heating and cooling the mixture, turbidity is observable in the coating film thus obtained.

In order to prevent the epoxy group-containing vinyl copolymer (A) from being substantially compatible with the epoxy group-containing vinyl copolymer (B), a difference in SP value between the epoxy group-containing vinyl copolymer (A) and the epoxy group-containing vinyl copolymer (B) is within a range from 0.5 to 4.0, and preferably from 1.0 to 4.0. The epoxy group-containing vinyl copolymer (B) preferably has a SP value lower than that of the epoxy group-containing vinyl copolymer (A).

As used herein, the SP value refers to a parameter which represents a polarity of the resin and is determined in the following manner.

After weighing 0.5 g of a sample in a 100 ml Erlenmeyer flask, 10 ml of tetrahydrofuran (THF) is added, thereby to dissolve the sample. The resulting solution is maintained at a liquid temperature of 25° C. and then hexane is added dropwise using a 50 ml burette while stirring using a magnetic stirrer. The point where turbidity occurs (turbidity point) is recorded as the amount of drops required ($V_h$).

Next, the amount of drops required ($V_d$) at the turbidity point is determined by using deionized water in place of hexane.

The SP value $\delta$ of the resin can be determined from $V_h$ and $V_d$ as follows, using the equation shown by SUH, CLARKE [J. Polym. Sci. A-1, Vol. 5, 1671–1681 (1967)].

$$\delta = ((V_{mh})^{(1/2)} \delta_{mh} + (V_{md})^{(1/2)} \delta_{md}) / ((V_{mh})^{(1/2)} + (V_{md})^{(1/2)})$$

where $V_{mh} = (V_h \cdot V_t)/(\phi_h \cdot V_t + \phi_t \cdot V_h)$, $V_{md} = (V_d \cdot V_t)/(\phi_d \cdot V_t + \phi_t \cdot V_d)$, $\delta_{mh} = \phi_h \cdot \delta_h + \phi_t \cdot \delta_t$, $\delta_{md} = \phi_d \cdot \delta_d + \phi_t \cdot \delta_t$, $\phi_h$, $\phi_d$, $\phi_t$: volume fraction of hexane, deionized water and THF at the turbidity point, $(\phi_h = V_h/(V_h+10)$, $\phi_d = /(V_d+10))$, $\delta_h$, $\delta_d$, $\delta_t$: SP value of hexane, deionized water and THF, and $V_h$, $V_d$, $V_t$: molecular volume of hexane, deionized water and THF (ml/mol).

As the polycarboxylic acid (C), aliphatic or aromatic polycarboxylic acids can be mainly used.

Typical examples thereof include succinic acid, glutaric acid, adipic acid, pimelic acid, suberic acid, azelaic acid, sebacic acid, brasylic acid, dodecanoic diacid, eicosanic diacid, tetraeicosanic diacid, maleic acid, citraconic acid, itaconic acid, and glutaconic acid; phthalic acid, isophthalic acid, trimellitic acid, pyromellitic acid, tetrahydrophthalic acid, hexahydrophthalic acid, and cyclohexene-1,2-dicarboxylic acid; and acid anhydrides thereof.

Also urethane-modified compounds obtained by reacting the polycarboxylic acids or anhydrides thereof with the polyisocyanate compounds can be used. These polycarboxylic acids (C) may be used alone, or two or more kinds of them can be used in combination. Among these polycarboxylic acids, an aliphatic dibasic acid is preferred because of its excellent physical properties of the coating film and the storage stability, and dodecanoic diacid and anhydride thereof is particularly preferred because of its excellent physical properties of the coating film.

With respect to a mixing ratio of the epoxy group-containing polyfunctional vinyl copolymers (A) and (B) to the polycarboxylic acid (C), an equivalent ratio of epoxy groups in the copolymers (A) and (B) to carboxyl groups in the polycarboxylic acid (C), ((A)+(B))/(C) is preferably within a range from about 0.5 to 1.5, and more preferably within a range from about 0.8 to 1.2.

To the powder coating composition of the present invention, publicly known and conventional various additives for coating composition and pigments, for example, pigment dispersants, curing catalysts, flow modifiers, matting agents, blocking inhibitors, ultraviolet absorbers, photostabilizers, benzoin, antistatic agents, and antioxidants can be added, if necessary, in addition to various synthetic resins such as epoxy resin, polyester resin, urethane resin, and polyamide resin.

As the ultraviolet absorber, photostabilizer and antioxidant, among these additives, there can be used various benzophenone-based compounds such as 2,4-dihydroxybenzophenone ("SEESORB 100"), 2,2',4,4'-tetrahydroxybenzophenone, 2-hydroxy4-methoxybenzophenone ("SEESORB 101"), 2,2'-dihydroxy-4,4'-methoxybenzophenone, and 2-hydroxy-4-methoxy-5-sulfobenzophenone; various benzotriazole-based compounds such as 2-(3,5-di-tert-amyl-2-hydroxyphenyl)benzotriazole ("TINUVIN 328"), 2-(2'-hydroxy-5'-methylphenyl)benzotriazole ("TINUVIN P"), and 2-[2-hydroxy-3,5-di(1,1-dimethylbenzyl)phenyl]-2H-benzotriazole ("TINUVIN 900"); various salicylate-based compounds such as phenylsalicylate ("SEESORB 201"); various substituted-acrylonitrile-based compounds such as ethyl-2-cyano-3,3'-diphenylacrylate ("SEESORB 501"); various anilide oxalate-based compound such as 2-ethoxy-2'-ethyloxalic acid bisanilide ("TINUVIN 312"); various nickel complex-based compounds such as [2,2'-thiobis(4-tert-octylphenolate)]-2-ethylhexylamine-nickel (II) ("SEESORB 612NH"); various hindered amine-based compounds such as bis(1,2,2,6,6,-pentamethyl-4-piperidyl) sebacate ("TINUVIN 292"), bis(2,2,6,6,-tetramethyl-4-piperidyl) sebacate ("TINUVIN 770"), 2-(3,5-di-tert-butyl-4-hydroxybenzyl)-2-n-butylmalonic acid bis(1,2,2,6-pentamethyl-4-piperidyl) ("TINUVIN 144"); and various phenol-based compounds such as 3,5-di-tert-butyl-4-hydroxytoluene ("BHT SWANOX"), tetrakis-[methylene-(3,5-di-tert-butyl-4-hydroxyhydrocinnamate)] ("IRGANOX 1010").

As the curing catalyst, for example, phosphines such as triphenylphosphine, imidazoles such as 2-methylimidazole, ammonium salts such as tetrabutylammonium chloride, phosphonium salts such as triphenyl phosphonium bromide, and tertiary amines such as methyldicocoamine can be used.

As the pigment, there can be used various inorganic pigments such as titanium oxide, red iron oxide, chrome titanium yellow, yellow iron oxide, and carbon black; publicly known and various conventional organic pigments, for example, phthalocyanine-based pigment such as phthalocyanine blue or phthalocyanine green, anthraquinone-based pigment such as indanthrene blue or dianthraquinonyl red, quinacridone-based pigment, azo-based pigment such as lake red, fast yellow, disazo yellow or permanent red, nitro-based pigment such as naphthol yellow, and nitroso-based pigment such as pigment green B or naphthol green; extender pigments such as calcium carbonate, barium sulfate, barium oxide, talc, and silica; and publicly known and conventional various (brilliant) metallic pigments such as aluminum flake and mica flake. As the matting agent, humed silica can be used.

As described above, the powder coating composition of the present invention is characterized by a particle configuration, for example, noticeably high average circularity as compared with a conventional powder coating composition. Based on such a particle configuration, excellent fluidity and coating operability are exhibited, and thus excellent smoothness and finishing appearance are achieved even when formed into a thin film.

As the process for preparing the powder coating composition, for example, wet granulation processes such as suspension polymerization process, freeze-drying process and spray-drying process can be employed. Among these processes, the spray-drying process is most suited to prepare the powder coating composition having the above feature of the present invention.

The powder coating composition of the present invention can be obtained with good productivity by spray-drying an organic solvent solution containing an epoxy group-containing vinyl copolymer (A) having a glass transition temperature of 40° C. or higher, an epoxy group-containing vinyl copolymer (B) having a glass transition temperature of 0° C. or lower, a polycarboxylic acid (C) and, if necessary, a coating film forming component such as pigments (hereinafter referred to as a "raw powder coating composition solution") at a temperature where the epoxy group-containing vinyl copolymers (A) and the polycarboxylic acid (C) do not substantially cause the curing reaction.

As the organic solvent used in the preparation of the raw powder coating composition solution using this process, there can be used a solvent which dissolves the epoxy group-containing vinyl copolymer (A) and the epoxy group-containing vinyl copolymer (B) but does not dissolve the polycarboxylic acid (C), a solvent which neither dissolves the epoxy group-containing vinyl copolymer (A) nor the epoxy group-containing vinyl copolymer (B) but dissolves the polycarboxylic acid (C), or a solvent which dissolves any of the epoxy group-containing vinyl copolymer (A), the epoxy group-containing vinyl copolymer (B) and the polycarboxylic acid (C). These solvents may be used alone, or two or more kinds of them may be used in combination. Among these solvents, the solvent which dissolves any of the epoxy group-containing vinyl copolymer (A), the epoxy group-containing vinyl copolymer (B) and the polycarboxylic acid (C) is preferred. When the epoxy group-containing vinyl copolymers (A) and (B) are resins obtained by the solution polymerization process, the solvent used in the polymerization of the epoxy group-containing vinyl copolymers (A) and (B) can also be used as a portion or all of the organic solvent.

This raw powder coating composition solution is preferably in the state where the epoxy group-containing vinyl copolymers (A) and (B) and the polycarboxylic acid (C) are completely dissolved in the organic solvent at a temperature lower than the spraying temperature, for example, at normal temperature. When the components are completely dissolved in the organic solvent, the epoxy group-containing vinyl copolymers (A) and (B) and the polycarboxylic acid (C) are mixed more uniformly as compared with the case of mixing due to melt-kneading performed in a conventional preparation process, thus making it possible to obtain a powder coating composition capable of forming a coating film which is superior in various physical properties of the coating film, including appearance of the coating film. The solvent, which does not dissolve any of the epoxy group-containing vinyl copolymers (A) and (B) and the polycarboxylic acid (C), can also be used as long as it does not impair the storage stability of the raw powder coating composition solution.

Examples of the organic solvent, which can be used in the preparation of the raw powder coating composition solution, include alkyl alcohols such as methanol, ethanol, n-propanol, isopropanol, n-butanol, isobutanol, sec-butanol, tert-butanol, n-pentanol, and isopentanol;

glycol ethers such as methylcellosolve, ethylcellosolve, ethylene glycol dimethyl ether, ethylene glycol diethyl ether, propylene glycol monomethyl ether, propylene glycol monoethyl ether, propylene glycol monopropyl ether, propylene glycol dimethyl ether, and propylene glycol diethyl ether;

aromatic hydrocarbons such as benzene, toluene, xylene, and ethylbenzene;

mixed hydrocarbons containing an aromatic hydrocarbon such as "Exxon Aromatic Naphtha No. 2" (manufactured by Exxon Corp., USA);

aliphatic hydrocarbons such as n-pentane, n-hexane, and n-octane;

mixed hydrocarbons containing an aliphatic hydrocarbon, such as "ISOPAR C", "ISOPAR E", "EXXSOL DSP100/140", "EXXSOL D30" (manufactured by Exxon Corp.), "IP Solvent 1016" (manufactured by Idemitsu Petrochemical Co., Ltd.);

alicyclic hydrocarbons such as cyclopentane, cyclohexane, methylcyclohexane, and ethylcyclohexane;

ethers such as tetrahydrofuran, dioxane, diisopropyl ether, and di-n-butyl ether; ketones such as acetone, methyl ethyl ketone, and methyl isobutyl ketone; and esters such as methyl acetate, ethyl acetate, n-propyl acetate, isopropyl acetate, n-butyl acetate, isobutyl acetate, n-amyl acetate, isoamyl acetate, hexyl acetate, ethyl propionate, and butyl propionate. A small amount of water can be used in combination with the organic solvents described above.

In view of an improvement in drying property of the coating composition particles during spray-drying, a solvent having a boiling point of 100° C. or lower at normal temperature preferably accounts for 65 to 100% by weight of the entire organic solvent.

When the polybasic carboxylic acid (C) is an aliphatic dibasic acid, the solvent preferably comprises at least one kind of alcohol having 4 or fewer carbon atoms, and the amount of the alcohol having 4 or fewer carbon atoms is preferably four times as much as that of the aliphatic dibasic acid contained in the raw powder composition solution in the weight ratio.

If necessary, the above-described pigments, other resins, curing catalysts and additives may be previously dissolved or dispersed in the raw powder composition solution before spray-drying.

A colored powder coating composition can be prepared by dispersing the pigments described above in the raw powder composition solution and sequentially spray-drying the solution. The pigments can be dispersed in the raw powder composition solution using a publicly known and conventional method such as using a sand mill. The colored powder coating composition can be prepared by mixing plural raw colored powder coating composition solutions, thereby to adjust the color, to prepare a raw colored powder coating composition solution, and spray-drying the solution.

Next, the spray-drier will be described.

The thermosetting powder coating composition of the present invention can be obtained by spray-drying the raw powder coating composition solution thus prepared as described above. The apparatus used in the spray-drying process may be any one capable of removing the organic solvent from the sprayed raw powder coating composition solution and, for example, there can be used a spray-drier which vaporizes the organic solvent by bringing the sprayed raw powder coating composition solution into contact with a heat source gas. The apparatus is preferably an anti-explosion type because the organic solvent is vaporized. The apparatus is preferably equipped with a solvent recovering device in view of maintaining the vapor content of the solvent in the heat source gas, which is used for drying the sprayed raw powder coating composition, at a low level.

When using the spray-drier which vaporizes the organic solvent by bringing the sprayed raw powder coating composition solution into contact with a heat source gas, the system for contacting the raw powder coating composition solution with the heat source gas is not specifically limited and may be any system, which is conventionally used, such as parallel-flow, counter-flow, or parallel-flow counter-flow mixed system.

With respect to the spraying system of the raw powder coating composition solution, there can be used a publicly known and conventional system such as spinning disc, two fluid nozzle, or pressure nozzle system. Factors for controlling the particle diameter during spraying include a spinning speed of a disc in the spinning disc system, factors include a discharge rate through a nozzle and a mixing ratio of compressed air used in combination with the raw material solution to the raw material solution in the two fluid nozzle system, and factors include a discharge pressure in the pressure nozzle system. These values may be appropriately decided according to the target particle diameter.

The feed rate of the raw material solution and the flow rate of the heat source gas may also be appropriately decided according to the target particle diameter. However, when the feed rate of the raw material solution and the flow rate of the heat source gas change during spray-drying, the particle diameter and particle size distribution of the resulting particles as well as nonvolatile content also change. Therefore, the feed rate of the raw material solution and the flow rate of the heat source gas are preferably maintained at a fixed value during spray-drying.

The heat source gas containing particles obtained by spray-drying is usually transferred to a classifier such as cyclone, where the particles are collected and classified. In the case in which the classification process for removing coarse particles and fine particles is required to control the particle size distribution of the powder coating composition of the present invention, a commercially available classifier can also be used.

As the heat source gas, an inert gas is preferred. Among the inert gases, a nitrogen gas is preferably used in view of the cost. The temperature of the heat source gas may be appropriately selected within a temperature range where the thermosetting resin and the curing agent of the raw powder coating composition solution do not substantially causes the curing reaction, that is, a temperature range where performances of the resulting powder coating composition are not substantially impaired even when the curing reaction partially occurs. The lower limit of the temperature of the heat source gas is not specifically limited, but is preferably 30° C. or higher, and more preferably 40° C. or higher, so as to efficiently vaporize the solvent. Usually, the temperature of the heat source gas is appropriately decided preferably within a range from 30° C. to 160° C., and more preferably from 40° C. to 130° C.

The flow rate of the heat source gas and the feed rate of the raw powder coating composition solution may be appropriately controlled according to the objective particle diameter under the conditions that the nonvolatile content of the resulting particles is 99% by weight or more. The pressure in the apparatus is not specifically limited and may be normal pressure, reduced pressure, or high pressure.

The nonvolatile content of the raw powder coating composition solution to be spray-dried may be appropriately decided according to the type of the spray-drier and the spray-drying conditions.

To vaporize the solvent more efficiently, the raw powder coating composition solution may be preheated before spray-drying. The preheating temperature is preferably 70° C. or lower to prevent gelation of the raw powder coating composition solution, and is preferably spray-dried as quickly as possible after preheating.

The powder coating composition thus obtained can be used as the powder coating composition as it is, but may be optionally secondarily-dried by another drying method such as vacuum-drying. In that case, secondary drying is preferably conducted at a temperature of about 70° C. or lower so as to prevent gelation of the powder coating composition.

The thermosetting powder coating composition of the present invention can be widely applied to automobile top coating, automobile intercoating, automobile parts, building materials, appliances, various metallic products, and the like.

The thermosetting powder coating composition can be coated by using various publicly known and conventional methods such as electrostatic spraying, frictional electrification coating, and fluidized bed coating methods, and a coated article of the powder coating composition can be obtained by baking at a temperature within a range from about 120° C. to 250° C.

In the coating film forming process for forming a single- or multi-layered coating film on an article to be coated, the powder coating composition of the present invention can be preferably used as an undercoat coating composition or a top coat coating composition. Because of its excellent smoothness, the powder coating composition can be more preferably used as a top coat coating composition in the coating film forming process for applying a base coat coating composition on an article to be coated and applying a top coat coating composition thereon. Furthermore, the base coat coating composition is preferably a water-based colored base coat coating composition and the top coat coating composition is preferably a transparent top coat coating composition.

As used herein, the articles to be coated refer to base materials coated with a coating composition, and are specifically non-coated metallic materials such as non-coated steel sheet, or untreated or chemically-treated aluminum base materials, and examples thereof include base materials used in vehicle bodies used on the road such as an automobile body or a motorcycle body, base materials used in automobile parts such as aluminum wheel, and base materials used in cans for beverages. Also there are base materials used in vehicle bodies used on the road such as automobile body subjected to electro deposition coating. Furthermore, there are base materials used in appliances, automatic vending machines, and furniture made of steels, for examples, zinc electroplated steel sheet, galvanized steel sheet, and various building interior and exterior materials such as tiles, glasses, doors of gates, fences, or aluminum sashes.

These base materials may in the form for their final purpose, or may be in the form to which a PCM (precoated metal) coating method is applied, that is, a plate-like cut plate base material which is folded into a predetermined configuration according to the purposes after forming a multi-layered coating film using the powder coating material composition of the present invention. The base material may also be a base material used in a coating system which is completely subjected to post-forming such as coil coating.

As described above, the thermosetting powder coating composition of the present invention can provide a coated article having excellent appearance, weather resistance and scratch resistance by applying on various articles to be coated described above, baking and drying according to a normal method.

EXAMPLES

The present invention will be described in more detail by way of Reference Examples, Examples and Comparative Examples. In the following Reference Examples, Examples and Comparative Examples, "parts" are "parts by weight" unless otherwise specified.

Reference Example 1

Preparation of Epoxy Group-containing Vinyl Copolymer (A-1)

In a reaction vessel equipped with a thermometer, a stirrer, a reflux condenser, and a nitrogen introducing inlet, 100 parts of xylene was charged and heated to 130° C.

To the xylene, a mixture of 30 parts of glycidyl methacrylate, 25 parts of n-butyl methacrylate, 30 parts of methyl methacrylate, and 15 parts of styrene as monomers, and 4 parts of tert-butylperoxy-2-ethyl hexanoate as a polymerization initiator was added dropwise over 5 hours.

After the completion of the dropwise addition, the polymerization reaction was continued while maintaining at the same temperature for 10 hours, and then completed to obtain a solution (A'-1) of an epoxy group-containing vinyl copolymer (A-1). Furthermore, xylene was removed by maintaining the resulting copolymer solution (A'-1) at 170° C. under reduced pressure of about 20 Torr to obtain an epoxy group-containing vinyl copolymer (A-1). The values of characteristics of the epoxy group-containing vinyl copolymer (A-1) and its solution (A'-1) are shown in Table 1.

Reference Example 2

Preparation of Epoxy Group-containing Vinyl Copolymer (A-2)

In the same manner as in Reference Example 1, except that the mixture was replaced by a mixture of monomers and a polymerization initiator shown in Table 1, a solution (A'-2) of the objective epoxy group-containing vinyl copolymer (A-2) was obtained. Furthermore, xylene was removed by maintaining the resulting copolymer solution (A'-2) at 170° C. under reduced pressure of about 20 Torr to obtain an epoxy group-containing vinyl copolymer (A-2). Values of characteristics of the epoxy group-containing vinyl copolymer (A-2) and its solution (A'-2) are shown in Table 1.

TABLE 1

|  |  | Reference Example 1 A-1 | Reference Example 2 A-2 |
|---|---|---|---|
| Monomers | Styrene | 15 | 15 |
|  | Methyl methacrylate | 35 | 25 |
|  | n-butyl methacrylate | 5 | 20 |
|  | Glycidyl methacrylate | 45 | 40 |
| Polymerization initiator | tert-butylperoxy-2-ethyl hexanoate | 7.5 | 4.0 |
| Values of characteristics of copolymer (A) | Glass transition temperature (° C.) | 70 | 60 |
|  | Number-average molecular weight | 2,300 | 3,200 |
|  | Epoxy equivalent | 345 | 375 |
|  | SP value | 10.39 | 10.14 |
| Values of characteristics of copolymer solution (A') | Nonvolatile content (%) | 51.5 | 51.0 |

Glass Transition Temperature (° C.)

Numerical value determined by converting the temperature (° K) calculated by Fox's equation at the temperature (° C.)

$$100/Tg = W1/Tg1 + W2/Tg2 + W3/Tg3 + W4/Tg4$$

where W1, W2, . . . each denotes a mass fraction (% by weight), and Tg1, Tg2, . . . each denotes a glass transition temperature (K) of a homopolymer of the respective components (as the glass transition temperature of the homopolymer, the value described in Polymer Handbook (Second Edition, edited by J. Brandrup, E, H, Immergut) was used)

Number-Average Molecular Weight

Number-average molecular weight determined by measuring the molecular weight of a tetrahydrofuran soluble component by gel permeation chromatography Epoxy Equivalent Value measured by the hydrochloric acid-pyridine method SP Value Value determined by the method described in detail in "embodiments of the present invention" of the present specification.

Reference Example 3

Preparation of Epoxy Group-containing Vinyl Copolymer (B-1)

In a reaction vessel equipped with a thermometer, a stirrer, a reflux condenser, and a nitrogen introducing inlet, 100 parts of xylene was charged and heated to 120° C.

To xylene, a mixture of monomers and a polymerization initiator shown in Table 2 was added dropwise over 4 hours. After the completion of the dropwise addition, the polymerization reaction was continued while maintaining at the same temperature for 10 hours, and then completed to obtain a solution (B'-1) of an epoxy group-containing vinyl copolymer (B-1).

Furthermore, xylene was removed by maintaining the resulting copolymer solution (B'-1) at 170° C. under reduced pressure of about 20 Torr to obtain an epoxy group-containing vinyl copolymer (B-1). The property values of the epoxy group-containing vinyl copolymer (B-1) and its solution (B'-1) are shown in Table 2.

Reference Example 4

Preparation of Epoxy Group-containing Vinyl Copolymer (B-2)

In the same manner as in Reference Example 3, except that the mixture of monomers and a polymerization initiator was replaced by a mixture shown in Table 2, a solution (B'-2) of an epoxy group-containing vinyl copolymer (B-2) was obtained. Furthermore, xylene was removed by maintaining the resulting copolymer solution (B'-2) under reduced pressure of about 20 Torr to obtain an epoxy group-containing vinyl copolymer (B-2). Values of characteristics of the epoxy group-containing vinyl copolymer (B-2) and its solution (B'-2) are shown in Table 2.

TABLE 2

|  |  | Reference Example 3 B-1 | Reference Example 4 B-2 |
|---|---|---|---|
| Monomers | Methyl methacrylate | 5 |  |
|  | 2-ethylhexyl acrylate |  |  |
|  | Glycidyl methacrylate | 15 | 30 |
|  | n-butyl methacrylate | 25 | 30 |
|  | 2-ethylhexyl methacrylate | 15 |  |
|  | "Acryester SL" |  | 40 |
|  | Stearyl methacrylate | 40 |  |
| Polymerization initiator | tert-butylperoxy-2-ethyl hexanoate | 0.2 | 0.7 |
| Values of characteristics of copolymer (B) | Glass transition temperature (° C.) | −42 | −16 |
|  | Number-average molecular weight | 9,400 | 6,700 |
|  | Epoxy equivalent | 950 | 480 |
|  | SP value | 8.53 | 8.91 |
| Values of characteristics of copolymer solution (B') | Nonvolatile content (%) | 50.0 | 49.8 |

Notice:
"Acryester SL": trade name of a mixture of a methacrylic acid alkyl ester having a $C_{12}$ alkyl group on the side chain and a methacrylic acid alkyl ester having a $C_{13}$ alkyl group on the side chain, manufactured by Mitsubishi Rayon Co., Ltd.

Reference Example 5

Preparation Example of Mixtures (S-1) and (S-2) of Epoxy Group-containing Vinyl Copolymers (A-1) and Epoxy Group-containing Vinyl Copolymers (B-1)

The solutions (A'-1) and (B'-1) of the epoxy group-containing vinyl copolymers obtained in Reference Examples 1 and 3 and the solutions (A'-2) and (B'-2) of the epoxy group-containing vinyl copolymers obtained in Reference Examples 2 and 4 were charged in a vessel at a solid content ratio of 97:3 and a solid content ratio of 95:5, respectively, and were mixed with stirring, and then xylene was removed by maintaining the mixture under reduced pressure of about 20 Torr to obtain mixtures (S-1) and (S-2) each having a nonvolatile content of 99.5% or more.

Example 1

Using the solutions (A'-1) and (B'-1) of the epoxy group-containing vinyl copolymer, epoxy group-containing vinyl copolymers (A-1) and (B-1) were mixed according to the formulation shown in Table 3 and then the resulting mixture was mixed with a polycarboxylic acid (C) and additives shown in Table 3 to prepare a raw powder coating composition solution. A powder coating composition was prepared from this raw powder coating composition solution by an anti-explosion type vertical down parallel-flow spray-drying apparatus equipped with a solvent recovering device using a spinning disc system as a spraying system. Using a vertical down parallel-flow system, a raw material solution was brought into contact with a nitrogen gas as a heat source gas at a disc spinning speed of 15,000 rpm. The temperature of the gas was set to 120° C. The raw powder coating composition solution preheated to 60° C. was sprayed in a spray-drier at a feed rate of 0.5 kg/hr and particles of the powder coating composition dried in the spray-drier were collected by a cyclone to obtain a powder coating composition of the present invention (X-1).

Figure 1:
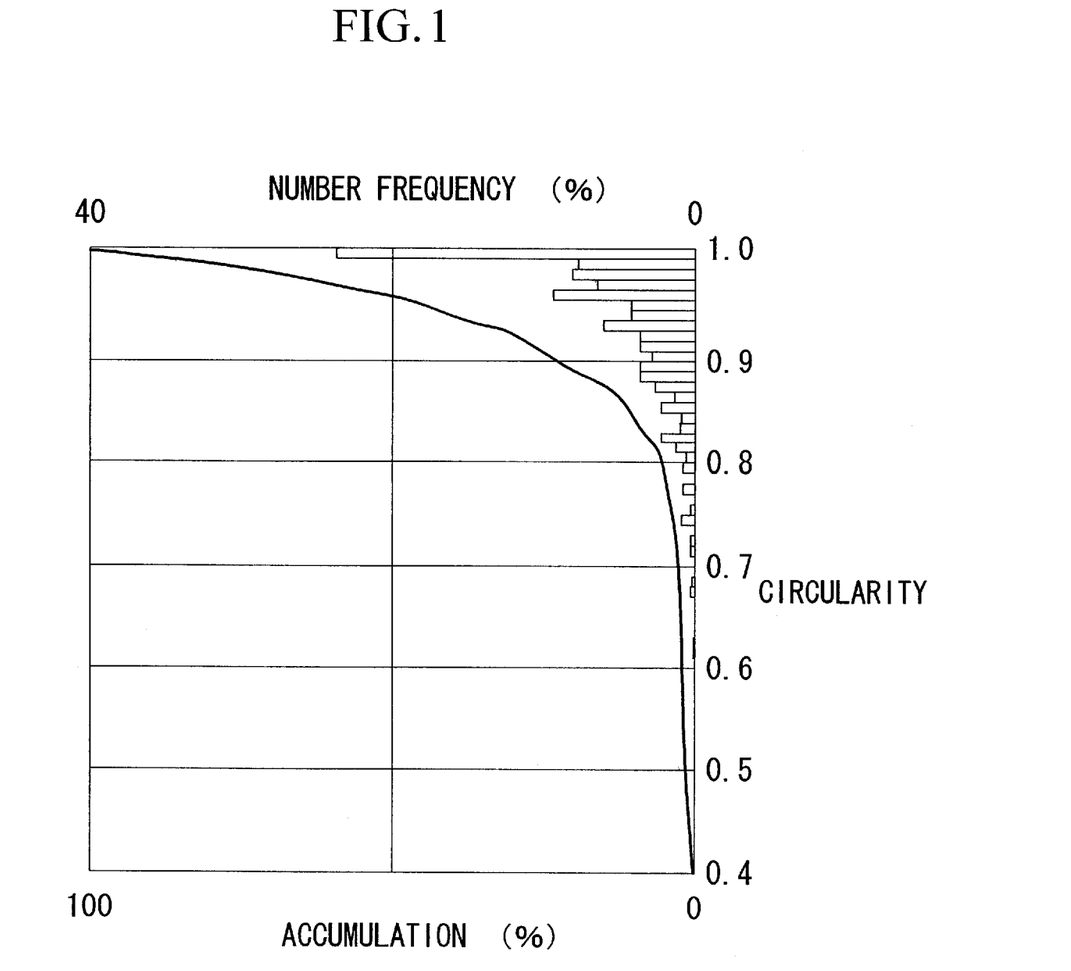
FIG. 1 is a graph showing circularity distribution of a coating composition to be obtained in Example 1.

The average particle diameter and the circularity distribution of the resulting powder coating composition (X-1) were determined by a flow type particle image analyzer (FPIA-1000, manufactured by Toa Medical Electronics Co., Ltd.). The resulting graph showing circularity distribution is shown in FIG. 1.

As a result, the average particle diameter was 15 μm, the average circularity was 0.97, and the circularity of particles having a maximum number frequency in circularity distribution was within a range from 0.99 to 1.00. As is apparent from FIG. 1, the number of particles having a circularity within a range from 0.99 to 1.00 is by far larger than that having the circularity, which is not within the above range, and the particles of this powder coating composition are generally completely spherical.

Circularity

It is one of one of particle configuration index, which indicates the unevenness of the surface of particles, and is represented by the following equation:

Circularity=(perimeter of a circle having the same area as that of a projected area of particles)/(perimeter of a projected image of particles).

As used herein, the term "circularity of particles having a maximum number frequency in circularity distribution" refers to a circularity within a section where a number frequency of the respective sections (circularity: 0.01 in width) becomes maximum when the circularity of 0.40 to 1.00 of particles is divided into 61 sections in the circularity frequency distribution determined by the measurement described above.

The powder coating composition (X-1) was applied on a 0.8 mm thick cold-finished steel sheet subjected to a zinc phosphating treatment using an electrostatic spray coater for powder coating, and then baked at 150° C. for 30 minutes to obtain test sheets each having a cured coating film formed thereon. The smoothness, gloss, and scratch resistance of the coating film and the storage stability of the powder coating composition were evaluated. The evaluation results and those of the coating operability of the coating composition are shown in Table 4.

Example 2

In the same manner as in Example 1, except that, using the solutions (A'-2) and (B'-2) of the epoxy group-containing vinyl copolymer, epoxy group-containing vinyl copolymers (A-2) and (B-2) were mixed according to the formulation shown in Table 3 and then the resulting mixture is mixed with a polycarboxylic acid (C), additives, and a pigment shown in Table 3 to prepare the raw powder coating composition solution, a powder coating composition (X-2) was prepared.

As a result, the average particle diameter of the resulting powder coating composition (X-2) was 35 μm, the average circularity was 0.95, and the circularity of particles having a maximum number frequency in circularity distribution was within a range from 0.99 to 1.00.

This powder coating composition (X-2) was applied in the same manner as in Example 1 and the coating film was evaluated. The results are shown in Table 4.

Comparative Example 1

Figure 2:
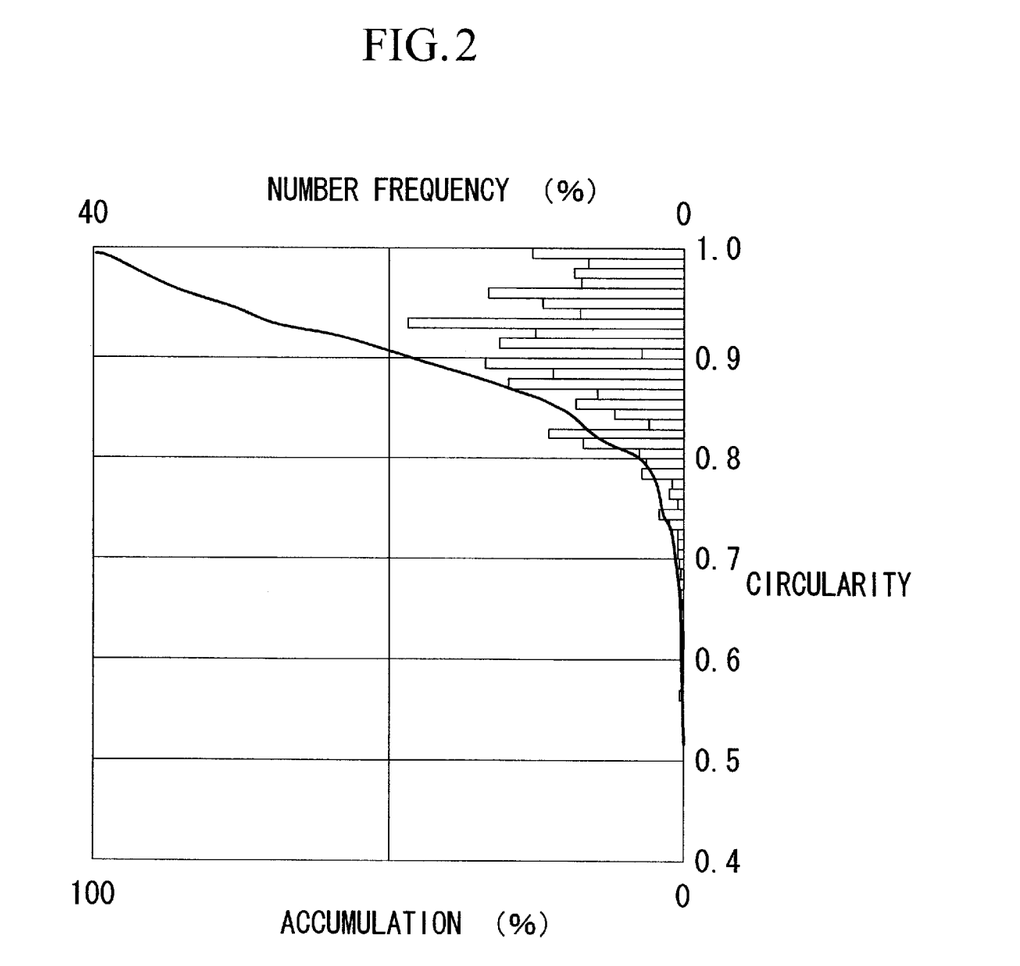
FIG. 2 is a graph showing circularity distribution of a coating composition to be obtained in Comparative Example 1.

The mixture (S-1) of the epoxy group-containing vinyl copolymer (A-1) and the epoxy group-containing vinyl copolymer (B-1) was used as the thermosetting resin component obtained in Reference Example 5 and then mixed with the respective components shown in Table 3 by the melt-kneading process to prepare a powder coating composition (Z-1). The average particle diameter and the circularity distribution of the resulting powder coating composition were determined in the same manner as in Example 1. The resulting graph showing circularity distribution is shown in FIG. 2. As a result, the average particle diameter of the resulting powder coating composition (Z-1) was 14 μm, the average circularity was 0.88, and the circularity of particles having a maximum number frequency in circularity distribution was within a range from 0.93 to 0.94.

As is apparent from FIG. 2, the powder coating composition contains particles having different circularities This powder coating composition (Z-1) was applied in the same manner as in Example 1 and the coating film was evaluated. The results are shown in Table 4.

Comparative Example 2

In the same manner as in Comparative Example 1, except that a mixture (S-2) of the epoxy group-containing vinyl copolymer (A-2) and the epoxy group-containing vinyl copolymer (B-2) was used and then mixed with the respective components shown in Table 3 by the melt-kneading process, a powder coating composition (Z-2) was prepared. As a result, the average particle diameter of the resulting powder coating composition (Z-2) was 36 μm, the average circularity was 0.86, and the circularity of particles having a maximum number frequency in circularity distribution was within a range from 0.93 to 0.94.

This powder coating composition (Z-2) was applied in the same manner as in Example 1 and the coating film was evaluated. The results are shown in Table 4.

Comparative Example 3

The epoxy group-containing vinyl copolymer (A-1) obtained in Reference Example 1 was used and then mixed with the respective components shown in Table 3 by the melt-kneading process, a powder coating composition (Z-3) was prepared. As a result, the average particle diameter of the resulting powder coating composition (Z-3) was 26 μm, the average circularity was 0.91, and the circularity of particles having a maximum number frequency in circularity distribution was within a range from 0.92 to 0.93.

This powder coating composition (Z-3) was applied in the same manner as in Example 1 and the coating film was evaluated. The results are shown in Table 4.

Comparative Example 4

In the same manner as in Comparative Example 1, except that the epoxy group-containing vinyl copolymer (A'-1)

obtained in Reference Example 1 was used and then mixed with the respective components shown in Table 3 by the melt-kneading process, a powder coating composition (Z-4) was prepared.

As a result, the average particle diameter of the resulting powder coating composition (Z-4) was 35 μm, the average circularity was 0.99, and the circularity of particles having a maximum number frequency in circularity distribution was within a range from 0.99 to 1.00.

This powder coating composition (Z-4) was applied in the same manner as in Example 1 and the coating film was evaluated. The results are shown in Table 4.

dispersion, the coating film was rubbed by moving the flannel cloth back and forth 50 times under a load of 500 g. Then, 20 degree gloss (20 degree mirror reflectance coefficient: %) before and after rubbing was measured. The scratch resistance was evaluated by so-called gloss retention (%) according the following five-level criteria.

Rating "5": gloss retention of 90% or more
Rating "4": gloss retention of 80% or more and less than 90%
Rating "3": gloss retention of 65% or more and less than 80%
Rating "2": gloss retention of 50% or more and less than 65%

TABLE 3

| | | Example 1 | Example 2 | Comparative Example 1 | Comparative Example 2 | Comparative Example 3 | Comparative Example 4 |
|---|---|---|---|---|---|---|---|
| Powder coating compositions | | X-1 | X-2 | Z-1 | Z-2 | Z-3 | Z-4 |
| Epoxy group-containing vinyl copolymers (A) and epoxy group-containing vinyl copolymers (B) | A-1 | 97 | | | | 100 | 100 |
| | A-2 | | 95 | | | | |
| | B-1 | 3 | | | | | |
| | B-2 | | 5 | | | | |
| Solidified articles | S-1 | | | 100 | | | |
| | S-2 | | | | 100 | | |
| Polycarboxylic acid (C) | Dodecanoic diacid | 29 | 26 | 29 | 26 | 29 | 29 |
| Additives | Benzoin | 0.5 | 0.5 | 0.5 | 0.5 | 0.5 | 0.5 |
| | "MODAFLOW P2000" | | 1.0 | | 1.0 | | |
| | "KP322" | 0.2 | | 0.2 | | 0.2 | 0.2 |
| Pigment | "CR-90" | | 56 | | 56 | | |

Notice:
"MODAFLOW P2000": trade name of acrylic-based leveling agent manufactured by Monsanto Company.
"KP322": trade name of silicon-based leveling agent manufactured by Shin-Etsu Chemical Co., Ltd.
"CR-90": rutile type titanium "TIPAQUE CR-90", manufactured by Ishihara Sangyo Kaisha, Ltd.

TABLE 4

| | Example 1 | Example 2 | Comparative Example 1 | Comparative Example 2 | Comparative Example 3 | Comparative Example 4 |
|---|---|---|---|---|---|---|
| Powder coating compositions | X-1 | X-2 | Z-1 | Z-2 | Z-3 | Z-4 |
| Film thickness (μm) | 30 | 40 | 31 | 41 | 35 | 35 |
| Smoothness | 5 | 5 | 4 | 3 | 2 | 4 |
| Gloss of coating film (60 degree gloss) | 97 | 96 | 91 | 89 | 92 | 93 |
| Gloss of coating film (20 degree gloss) | 92 | 90 | 81 | 80 | 79 | 85 |
| Scratch resistance | 5 | 5 | 4 | 4 | 1 | 2 |
| Storage stability | Δ | ○ | X | X | Δ | ○ |
| Coating operability | ○ | ⊚ | X | X | X | ○ |

Procedure for Evaluation of Physical Properties of Coating Composition and Coating Film Film thickness: measured by an electromagnetic thickness meter.

Smoothness: visually evaluated according to the following five-level criteria.

Rating "5": very smooth coated surface
Rating "4": small roundness present
Rating "3": large roundness present
Rating "2": large roundness present with considerable orange peel surface
Rating "1": large roundness present with severe orange peel surface, which severely damages the appearance of the coating film Gloss of coating film: measured by mirror gloss defined in JIS-K5400.

Scratch resistance: cleanser resistance was examined. After impregnating a flannel cloth with a 5% cleanser-water Rating "1": gloss retention of less than 50%

Storage stability: the powder coating composition was stored at 35° C. for one month and the fluidity of the powder coating composition was evaluated.

Rating "○": no agglomerate, good fluidity
Rating "Δ": collapsible small agglomerate
Rating "X": non-collapsible small agglomerate Coating operability: the powder coating composition was continuously applied through an injector from a fluidized bed for one hour, using a hose, and the deposited state of the powder coating composition in the injector and hose was visually judged.

Rating "⊚": no powder coating composition was deposited
rating "○": powder coating composition was slightly deposited
rating "X": powder coating composition was deposited to cause clogging of injector or hose

What is claimed is:

1. A thermosetting powder coating composition comprising, as a coating film forming component, particles containing an epoxy group-containing vinyl copolymer (A) having a glass transition temperature of 40° C. or higher, an epoxy group-containing vinyl copolymer (B) having a glass transition temperature of 0° C. or lower and a polycarboxylic acid (C), wherein an average particle diameter of entire particles is within a range from 5 to 50 μm, an average circularity of the particles is 0.90 or more, and a circularity of particles having a maximum number frequency in circularity distribution is within a range from 0.98 to 1.00.

2. The thermosetting powder coating composition according to claim 1, wherein the epoxy group-containing vinyl copolymer (B) has an SP value lower than that of the epoxy group-containing vinyl copolymer (A) and a difference in SP value between the epoxy group-containing vinyl copolymer (A) and the epoxy group-containing vinyl copolymer (B) is within a range from 0.5 to 4.0.

3. A coated article comprising an article to be coated and a coating film formed on the article to be coated by thermosetting the powder coating composition according to claim 1 or 2.

4. A process for preparing a thermosetting powder coating composition, wherein an average particle diameter of entire particles is within a range from 5 to 50 μm, an average circularity of the particles is 0.90 or more, and a circularity of particles having a maximum number frequency in circularity distribution is within a range from 0.98 to 1.00, by spray-drying a raw powder coating composition solution comprising an epoxy group-containing vinyl copolymer (A) having a glass transition temperature of 40° C. or higher, an epoxy group-containing vinyl copolymer (B) having a glass transition temperature of 0° C. or lower and a polycarboxylic acid (C).

* * * * *